United States Patent Office 3,748,302
Patented July 24, 1973

3,748,302
FLAME-RETARDED ACRYLONITRILE FIBERS
Edward Barry Jones, Waynesboro, Va., assignor to E. I. du Pont de Nemours and Company, Wilmington, Del.
No Drawing. Filed Nov. 17, 1971, Ser. No. 199,765
Int. Cl. C08f 45/04
U.S. Cl. 260—41 B
5 Claims

ABSTRACT OF THE DISCLOSURE

A flame-retardant fiber of an acrylonitrile copolymer that contains at least 10% by weight atoms of chlorine or bromine, said atoms being directly connected to carbon atoms of the copolymer; said copolymer having distributed throughout, finely divided particles of an oxide of antimony, in an amount of at least two percent by weight based on the weight of the copolymer, said particles being less than 500 A. in size; said copolymer also having distributed throughout, particles of a metallic oxide greater than 500 A. in size in an amount sufficient to deluster the fiber but not more than 2.25% of the area of an electron micrograph of a cross-section of the fiber.

BACKGROUND OF THE INVENTION

(1) Field of the invention

This invention relates to flame-retardant fibers of acrylonitrile polymer compositions. More particularly, it relates to delustered, flame-retardant fibers of acrylonitrile polymer compositions that exhibit good dyeability.

(2) Description of the prior art

Fibers of acrylonitrile polymer are rather flammable, and propagate flame rapidly in the vertical direction. To make acrylonitrile polymer fibers flame retardant, it is known to incorporate halogen-containing comonomers such as vinyl chloride or vinylidene chloride within the polymer chain. It is also known that antimony oxide enhances the flame-retarding effect of the halogen incorporated within the polymer chain.

For commercial acceptability, it is required that flame-retardant fibers be substantially equivalent in other fiber properties to conventional fibers which are not flame-retardant. One such conventional fiber, employed in large volume for the manufacture of garments and for other textile purposes, is a delustered fiber of acrylonitrile polymer characterized by good dyeability. In attempting to adapt this fiber to be flame-retardant, it has been found that the amount of conventional, commercially available, finely ground antimony oxide required to obtain an effective degree of flame retardancy in such that the dyeability of the acrylonitrile polymer fiber is markedly reduced. An object of the present invention is to provide a delustered, flame-retardant fiber of an acrylonitrile polymer composition which exhibits good dyeability.

SUMMARY OF THE INVENTION

This invention is directed to a fiber which comprises an acrylonitrile copolymer containing at least 10% by weight atoms of chlorine or bromine, said atoms being directly connected to carbon atoms of the copolymer; said copolymer having distributed throughout finely divided particles of an oxide of antimony in an amount of at least 2% by weight based on the weight of copolymer, said particles being less than 500 A. in size; said copolymer also having distributed throughout, particles of a metallic oxide greater than 500 A. in size in an amount sufficient to deluster the fiber, but not more than 2.25% of the area of an electron micrograph of a cross section of the fiber. The amounts of the halogen and oxide of antimony taken together are effective for flame retardance. Preferably, the amount of oxide of antimony present is at least 2.5%. Because the chlorine or bromine atoms are attached to the carbons of a polymer chain and much or all of the oxide of antimony is present in an extremely fine state of sub-division, the dyeability of the fiber is good and the dye fibers are characterized by good, clear colors.

DESCRIPTION OF THE INVENTION

The acrylonitrile copolymer of which the fibers of the present invention are composed is a copolymer of acrylonitrile and at least one chlorine- or bromine-containing, ethylenically unsaturated, monomeric compound. In the halogen-containing monomeric compound, the chlorine or bromine atom should be directly connected to a carbon atom. The copolymer may contain units derived from more than one such halogen-containing compound. In addition, the copolymer may contain other ethylenically unsaturated compounds polymerized with acrylonitrile. Preferred chlorine- or bromine-containing monomers include vinyl chloride, vinyl bromide, and vinylidene chloride. Other halogen-containing monomers which are suitable in accordance with the invention include vinylidene bromide, 3-bromo-2,2-bis(bromomethyl)propyl acrylate, 2,3-dibromopropyl acrylate and other halogenated esters of acrylic and methacrylic acid, α-chloroacrylonitrile, bis(chloroethyl)vinyl phosphonate, and brominated and chlorinated styrenes. Other ethylenically unsaturated compounds which may be polymerized with the acrylonitrile and halogen-containing monomer include methyl acrylate, methyl methacrylate, vinyl acetate, methyl vinyl pyridine, and sodium styrenesulfonate or other derivatives of styrenesulfonic acid. The acrylonitrile content of the polymer should be at least about 60% by weight, and the halogen content should be at least about 10%, based on polymer weight. The upper amount of halogen content may vary according to the properties desired in the fiber. Preferably the upper amount will be in the range of 20 or 30% by weight of polymer.

The oxide of antimony may be either antimony trioxide, antimony pentoxide, or a mixture of these having an intermediate empirical composition between the trivalent and pentavalent states of antimony. The term "oxide of antimony" as used herein and in the claims is intended to include any of these forms in either their hydrous or anhydrous states. It is also meant to include compounds containing an oxide of antimony plus an oxide of one or more other metals, or another compound that is in a chemically or physically associated form with the antimony oxide. Thus, titanium dioxide, tin oxide, zinc formate, antimony tartrate, antimony oxychloride, or other compounds may be present within the fiber. Such other materials may be present as supplementary flame-retardant agents, colloidal sol stabilizers for the antimony oxide, or for other reasons. Preferably, however, only the antimony oxides are present. The oxide of antimony may be derived by hydrolysis within the fiber of another compound of antimony, such as glyoxide of antimony, which is spun into the fiber. The total content of oxide of antimony should be at least 2% by weight of the polymer, preferably at least 2.5%, the amounts of oxide of antimony and halogen taken together being effective for flame retardancy. An upper limit on the amount of oxide of antimony present is determined only by choice of properties caused by the presence of the antimony oxide; however, preferably the amount will not exceed about 8%.

The delusterant may be any metal oxide material having a particle size greater than 500 A. The metal oxide material of large particle size should be added in an amount effective for the desired degree of delustering, usually in the range of about ¼% to 2% by weight, based on polymer weight. The area of fiber cross section in an electron micrograph of the fiber occupied by the delusterant is affected not only by the kind of metal oxide used as the delusterant but also by its particle size, even for the same given delusterant. To produce the fibers of good dyeability of the present invention, the amount of large particle size, i.e. over 500 A., metal oxide which is added should be such that not more than 2.25% of the area of an electron micrograph of a cross section of the fiber is comprised of such particles. In a preferred embodiment of the invention, the metal oxide is titanium dioxide of conventional, delustering particle size. In another preferred embodiment of the invention, the delustering metal oxide is an oxide of antimony of delustering, large particle size. Other delusterants which may be employed include silica, as well as various mixed metal oxides of large particle size.

METHODS FOR MAKING THE PRODUCTS OF THE INVENTION

The methods of making products within the scope of the invention are of two general types. In each case the method involves the preparation of an acrylonitrile polymer containing units derived from a halogen-containing ethylenically unsaturated comonomer in the form of a solution in a polar organic liquid which is a solvent for the polymer, with incorporation of an antimony compound in a form having a particle size less than 500 A. together with a delustering metal oxide of particle size greater than 500 A. Dimethylformamide is a suitable liquid. The metal oxide delusterant is usually added separately in the form of a slurry or dispersion in the same polar organic liquid in which the polymer is dissolved, or in any event in a solvent which is compatible with the polar organic liquid. The antimony compound having a particle size less than 500 A. is usually also added separately in solution or dispersion in the polar organic liquid or another liquid which is compatible with it. The combined mixture is thoroughly blended and heated, after which it is spun to form fibers with removal of the organic solvent. The fibers can be formed either by dry spinning or by wet spinning. Further processing of the fibers involves the conventional steps of extraction of residual solvent and stretching and crimping. The fibers are conventionally exposed to water in an aqueous treatment at some point of the process, and they are subsequently dried as required.

One route for making the products of the invention involves incorporating the oxide of antimony in the form of a sol in a polar organic liquid, the particle size of the oxide of antimony in the sol being very small, so that almost all of the oxide of antimony exists in the form of particles in the range of from about 500 A. down to almost molecular size. Such sols can be made by a process which involves reacting antimony trichloride with water and ammonia in a solution of a polar organic liquid such as dimethylformamide. The reaction produces antimony trioxide in colloidal dispersion, together with ammonium chloride, which is insoluble in the dimethylformamide and which is subsequently removed therefrom by filtration. The sol is preferably stabilized by exchanging a stabilizing anion such as the formate, acetate, hydroxyacetate, salicylate, or phthalate anions for residual chloride ion. The sol can also be stabilized by reacting the surface of the antimony oxide particles with a primary or secondary alcohol to form an ester group. It is preferred to add only that amount of stabilizing agent equivalent to the number of surface groups. Another method for stabilizing the sol antimony trichloride in the reaction mixture, so that the product produced is a mixed antimony trioxide-titanium oxide sol characterized by a high degree of stability of particle size.

In the route described above, a sol of the oxide of antimony having a very small particle size is thus prepared, and the sol is added to the solution of the acrylonitrile polymer together with the delustering metal oxide, after which the filaments are extruded with the oxide of antimony already formed within the filament in its very fine particle size. When the antimony oxide itself is used as the delustering metal oxide or as a portion of it, part or all of the particles of the oxide of antimony having a particle size of less than 500 A. may comprise non-agglomerated particles present in the antimony oxide material added as the delusterant.

Another route for forming the fibers of the invention involves preparing a solution of an organic compound of trivalent or pentavalent antimony in a polar organic liquid which is a solvent for the polymeric material, mixing this solution with the solution of the acrylonitrile polymer together with the delustering metal oxide, spinning the filament therefrom, and finally forming the oxide of antimony within the filament by hydrolyzing the organic antimony compound by treatment of the fiber with hot water (70–100° C.). Since the filaments of acrylonitrile polymer are conventionally exposed to hot water at some stage of their processing, a separate hydrolysis step is not usually required. This method is capable of providing the oxide of antimony within the filament in a molecular or near-molecular state of sub-division, so that the desired particle of less than 500 A. is readily achieved.

The method involving the use of a solution of an organic compound of trivalent or pentavalent antimony in a polar liquid requires the use of a compound which is, of course, soluble in the liquid. The compound should also be hydrolyzed by water with relative ease, although it should not be a compound which is extremely sensitive to hydrolysis. Esters of pentavalent antimony with ethylene glycol, glycerol, or other aliphatic polyhydroxy compounds containing vicinal hydroxyl groups are eminently suitable for this purpose. Also suitable for this purpose are antimony tartrate and compounds of pentavalent antimony with various α-hydroxycarboxylic acids.

DEFINITIONS AND TESTS

As used herein, the term "flame-retardant" is applied to shaped articles having a lower burning propensity than corresponding shaped articles made of compositions containing no halogen or metal oxide, or amounts of these materials insufficient to lower the burning propensity significantly. Various tests have been devised to evaluate the degree to which a shaped article is flame retardant. In the examples, flame retardance is determined by the standard limiting oxygen index analysis.

LIMITING OXYGEN INDEX (LOI) ANALYSIS

In this test, a staple pad specimen prepared by carding 4 grams of fiber into a pad 6 inches by 3 inches is mounted in a holder 6 inches by 2 inches in a chamber (General Electric type FL–101 Flammability Index Tester) and the sample is ignited at the top. The oxygen content of the atmosphere in the chamber is varied until the minimum oxygen level required for sustained combustion is obtained. The LOI value for the test sample is then recorded as the fraction of oxygen in the atmosphere, expressed to three decimal places, corresponding to this minimum oxygen level for sustained combustion. (Ref.: "Candle-Type Test for Flammability of Polymer," C. P. Fenimore and F. J. Martin, Modern Plastics, November, 1966, page 141.) A typical LOI value for a fabric of a commercially available acrylic fiber not modified for flame retardance is 0.169.

Two additional flammability tests, mentioned in Example I, are described below.

MODIFED 45° ANGLE TEST

This test is based on Test Method AATCC 33—1962, as described on pages B–139 to B–142 of the AATCC Technical Manual, 1968 Edition, Volume 44, September 1968 (Published by American Association of Textile Chemists and Colorists, Research Triangle Park, N.C. In the published method, the specimen is held at an angle of 45° and a standardized flame is applied to the surface near the lower end for one second; however, in the modified method as used herein, the impingement of the flame with the specimen is maintained until it ignites, up to a maximum of 30 seconds. If the specimen does become ignited, the flame is removed as soon as it ignites. Specimens which fail to ignite are rated "Would Not Ignite." Specimens which become ignited, but in which the flame goes out, are rated "Self-Extinguishing." Specimens which continue to burn are rated "Totally Consumed." While results obtained in this test cannot be precisely correlated with LOI values, it is usually found that fabrics having an LOI value below 0.240 are totally consumed in this test.

THE VERTICAL TEST

This is a very severe test of the flame retardancy of fabrics and other articles. The test employed is Method 5902 as described in "Textile Test Methods, Federal Specification CCC–T–191b, May 15, 1951," published by the General Services Administration, Business Service Center, Region 3, Washington, D.C. Results reported herein are obtained by testing the specimen in accordance with the method as published; except that the fabric specimens are more rigorously dried (specimens are dried in air at 105° C. for 30 minutes).

DYE YIELD

A numerical measure of the dye field of a dyed fiber is given by its K/S value, which is a measure of the light reflected from a sample of the dyed fiber. The death of color of the dyed fiber is approximately proportional to the K/S value; i.e., the large the K/S value is, the deeper the shade of the fiber. For the most meaningful use of the K/S value, comparisons should be made between fibers having the same polymeric composition. A difference of 10% in K/S values is easily seen as a shade difference between fibers.

The K/S values are determined by the general method described by P. Kubelka and F. Munk, Z. Tech. Physik 12, 593–601 (1931). All samples are dyed to exhaustion to contain 2% dye on fiber. A 2-gram sample of dyed fiber is hand-carded into an opaque, homogeneous mass or pad measuring approximately 4" x 3" x ¾" (10.2 cm. x 7.6 cm. x 1.9 cm.). The pad is placed in a reflectometer (such as the "Colormaster Model V Differential Reflectometer," manufactured by Meeco Instruments, Warrington, Pa.), using a filter appropriate to the dyed fiber being measured. The pad is placed in the instrument and a reflectance reading is obtained. The sample is then turned through 90° and a second reading is obtained. The pad is then turned over and two other readings obtained as before. The average of these four reflectance readings is used to determine the K/S value.

DETERMINATION OF FIBER CROSS SECTIONAL AREA COMPRISED BY PARTICLES GREATER THAN 500 A. IN SIZE

In this determination, the yarn specimen is mounted for transverse sectioning by embedding it in a thermosetting epoxy resin. The specimen is trimmed to suitable size and is then sectioned for microscopic examination, using a diamond knife (employing an instrument such as a LKB "Ultratone"). The instrument is adjusted to give sections of nominal thickness of 1500 A. Enough sections are obtained from each specimen to include at least 30 different filament cross sections. The sections so obtained are inserted in turn into a transmission electron microscope and viewed with the electron beam at 100 kv. accelerating voltage at a nominal magnification at 2500×, the exact magnification being calibrated. At this magnification, one filament cross section approximately fills the field of view. Electron micrographs for at least 30 different filament cross sections are recorded. Care is taken to select the areas which are micrographed randomly, so that micrographs having a high or low incidence of features are neither deliberately selected nor deliberately excluded. High contrast photographic procedures are then employed to prepare prints from the electron micrographs. Desirably, the size of the high contrast print is adjusted so that the total magnification is 2000×.

An optical image is derived from the high contrast photographic print and is projected onto the screen of a television camera (employing an instrument such as the "Quantimet, Model B," manufactured by Metals Research Ltd.). The electrical output from the television camera is passed to a closed circuit television monitor which provides a large display image, and also into a detector unit which can be set to discriminate features of the image. Employing the high contrast photographic print having a 2000× magnification, the detection limit is set at 0.1 mm. by selection of the camera optics, so that measurements are made only on particles greater in size than 500 A. The instrument is adapted for direct measurement of the total detected feature area, and this value is recorded for each of the 30 electron micrographs. An average value for the total detected feature area is calculated from the 30 individual electron micrographs measured, and this average value is taken as the percentage of the cross sectional area of the fiber which is comprised of particles greater than 500 A. in size.

EXAMPLE I

Delustered, flame-retardant, acrylonitrile/vinylidene chloride/sodium styrenesulfonate terpolymer having good dyeability Preparation of antimony-titanium oxide sol.—An antimony ($Sb^{+3}$)-titanium ($Ti^{+4}$) oxide sol in dimethylformamide (DMF hereinafter) is prepared according to the procedure described below.

Sixteen hundred grams of antimony trichloride is dissolved in 4300 gms. of DMF in a 22 liter flask, to which 190 gms. of distilled water is then added. While the solution is under vigorous agitation, anhydrous ammonia is introduced into the solution by bubbling. The resulting chemical reaction is monitored by measuring the pH of the solution.

Initially the solution has a pH of 1.2 at 23° C. As ammonia is bubbled in, the pH of the solution increases slowly, and upon reading a pH of 2.5 at 18° C., the solution becomes turbid as a result of the precipitate formation. The reaction is permitted to proceed further by adding the ammonia continuously, and when a pH of 2.9 at 16° C. is reached, the flow of ammonia is stopped. The temperature of the solution is kept below 25° C. throughout the introduction of ammonia. The solution is then suction filtered through a "coarse" grade fritted ceramic filter plate. The clear filtrate is again bubbled with ammonia in the manner described above, and the precipitate is again removed by filtration. The procedure is repeated two additional times, recovering 4706 gms. of a clear filtrate which is an antimony oxide sol containing 4.7% chloride.

The titanium oxide sol that is used to stabilize the antimony oxide in DMF is prepared as described below:

Twenty-six hundred and three grams of titanium tetrachloride is dissolved in 6000 gms. of DMF in a 22 liter flask. The 276 gms. of distilled water is added, followed by the addition of 1000 gms. of DMF containing 404 gms. of distilled water to the solution. A preliminary test is made to determine the optimum reaction concentration of $TiCl_4$ in DMF. Based on the test, an additional 7200 gms. of DMF is mixed with the previously prepared $TiCl_4$/DMF solution. As in the preparation of the antimony oxide sol in DMF, anhydrous ammonia is bubbled into the $TiCl_4$/DMF solution. The pH of the solution is initially 0.7 at 20° C., and with the addition of ammonia it reaches 0.5 at 19° C. where the solution becomes turbid. When the pH of 0.4 at 21° C. is reached, the bow of ammonia is stopped and the entire liquid is filtered. The filtrate is again bubbled with ammonia, and the precipitate is removed by filtering the liquid through a "coarse" grade fritted ceramic filter plate. The filtrate is again bubbled with ammonia and after the flow of amonia is stopped, the precipitate of $NH_4Cl$ is removed as described above. The procedure is repeated three additional times, recovering 14,825 gms. of a titanium oxide sol containing 4.09% Ti and 5.8% Cl and 3.14% $H_2O$. A total of 579 gms. of ammonia is used for this reaction.

The antimony oxide sol and titanium oxide sol prepared above are mixed together in the following portions: to 1888 gms. of titanium oxide sol is added 472 gms. of antimony oxide sol and the mixture is homogenized by stirring at 60° C., resulting in a slightly turbid antimony-titanium oxide sol, which is designated Mixture (A).

A separate batch of antimony-titanium oxide sol, designated Mixture (B), is prepared by mixing 1180 gms. of the titanium oxide sol above and 472 gms. of a different batch of antimony-titanium oxide sol which is prepared according to the procedure described as follows:

Three thousand four hundred twenty grams of antimony trichloride is dissolved in 6000 gms. of DMF in a 22 liter round bottom glass flask. The chloride is added slowly into the DMF over a period of 4 minutes while the solution is externally cooled with ice. The temperature of the solution rises temporarily to 50° C. When the solution is cooled to 35° C., 405 gms. of distilled water is added, resulting in a decrease in Hp from 1.7 to 0.9. While the solution is under vigorous agitation, anhydrous ammonia is introduced into the solution by bubbling through a 5/32" I.D. glass tube, the tip of which is submerged about 3" below the surface of the solution.

Initially the solution has a pH of 0.9 at 20° C. As the ammonia is bubbled in, the pH of the solution increases slowly and upon reaching a pH of 2.9 at 29° C., a white precipitate is formed. While the ammonia is bubbled in, the precipitated ammonium chloride is removed continuously by circulating the liquid through a centrifuge filter, and returning the filtrate to the reaction flask. When a pH of 2.4 at 25° C. is reached, the flow of ammonia is stopped and the entire liquid is filtered, recovering the clear filtrate. A total of 310 gms. of ammonia is bubbled into the solution over a period of about 5 hours. As previously, the clear filtrate is again bubbled with ammonia and the precipitate is removed continuously in the manner described above. When a pH of 2.9 at 16° C. is reached, the flow of ammonia is stopped and the entire solution is filtered, and 9315 gms. of slightly turbid filtrate containing 18.8% Sb and 9.3% chloride are recovered.

To 9240 gms. of the antimony oxide sol prepared immediately above is added 8308 gms. of titanium tetrachloride/DMF/$H_2O$ solution which is prepared in two portions: (1) dissolve 1451 gms. of titanium tetrachloride ($TiCl_4$ hereinafter) in 2500 gms. of DMF and add 400 gms. of distilled water, and (2) dissolve 1339 gms. of $TiCl_4$ in 2300 gms. of DMF and add 318 gms. of distilled water. While under agitation, the mixed solution of the sol and $TiCl_4$/DMF is bubbled with ammonia as described previously. Initially, the solution has a pH of 1.45 at 14° C. Upon reaching a pH of 1.95 at 20° C., the solution is filtered continuously as before, and at a pH of 2.5 at 25° C., the flow of ammonia is stopped and the entire solution is filtered. A total of 278 gms. of ammonia is added over a period of 135 minutes. The yellow filtrate is again bubbled with ammonia and the ammonium chloride precipitate is filtered by centrifuging and recirculating the filtrate into the reaction flask. When the pH reaches 3.6 at 20° C., the flow of ammonia is stopped and the entire solution is filtered, thereby recovering a total of 14,002 gms. of clear, yellow filtrate. Three hundred forty grams of ammonia is consumed in a period of 170 minutes. The antimony-titanium oxide sol prepared in this manner has 10.9% Sb, 4.0% Ti, and 9.9% chloride.

Finally, the two separate batches of antimony-titanium oxide sols, i.e., Mixture (A) and Mixture (B), are mixed together, thus preparing a sol which is yellow but slightly turbid. By filtering, about 11 grams of precipitate is removed, resulting in a clear sol that contains 3.37% Sb, 3.41% Ti, 3.5% Cl, and 2.22% $H_2O$, corresponding to a mol ratio of 1:2.56 for antimony to titanium and 1:1 for chloride to metal cations. The maximum dimensions of the antimony oxide particles in these sols are less than 500 A.

Preparation of polymer.—An acrylonitrile/vinylidene chloride/sodium styrenesulfonate terpolymer is prepared in a 7-liter aluminum reactor equipped with an overflow to maintain constant volume, agitator, thermometer, and an external water jacket to regulate the reaction temperature, the reactor being prefilled with deionized water under a blanket of argon. The temperature in the reactor is brought to and maintained at 35° C. To the reactor are fed continuously the following solutions:

(a) A mixture of 9960 ml. of acrylonitrile, 2264 gms. of vinylidene chloride, and 5250 ml. of methanol at the rate of 68.4 gms./min.;

(b) A solution of 37.3 gms. of potassium persulfate in 7500 ml. of deionized water at the rate of 23.5 gms./min.;

(c) A solution of 390 gms. of sodium metabisulfite and 0.508 g. of ferrous ammonium sulfate in 7500 ml. of deionized water at the rate of 23.5 gms./min.; and (d) A solution of 100 gms. of sodium styrenesulfonate in a mixture of 2940 ml. of deionized water and 4520 ml. of methanol at the rate of 47.1 gms./min.

Sulfur dioxide is metered into the reaction mixture at a rate sufficient to maintain the effluent from the reactor at a pH in the range of 2.5–3.5. The reaction is allowed to proceed for 2 hours under a blanket of argon. The effluent is then collected and the reaction in the effluent is stopped by addition of a 1% solution of the tetrasodium salt of ethylenediaminetetraacetic acid, adjusted to a pH of 3.5. The effluent is then filtered and the collected polymer is washed twice with water, the volume being equal to that of the collected effluent, and twice with acetone in similar volume. The polymer is then dried at 50° C. overnight in a vacuum oven. The conversion of monomer to polymer is 53.4%. Analysis of random samples of the polymer give average results of 1.41 for intrinsic viscosity, 153.6 meq./kg. for acidity, and 17.51% for chloride content (equivalent to 23.9% of vinylidene chloride incorporated into the polymer).

Preparation of delustered fiber.—A quantity of 627 gms. of the terpolymer is blended into a mixture of 494 gms. of dimethylformamide, 26.4 gms. of a 10% slurry of $TiO_2$ in dimethylformamide, 855 gms. of the sol, and 13.2 gms. of an alkyl tin mercaptide stabilizer (Thermolite® 31, product of M & T Chemicals, Inc.), prechilled to below −30° C. The mixture is allowed to warm up to room temperature with stirring, and is then stored for 4 hours at 60° C., during which time it dissolves. The solution is then further heated to 115° C. and dry-spun by forcing the solution through a spinneret into an aspiration chamber preheated to 150° C., in which air preheated to 160° C. is constantly circulated. The spinneret employed has 18 orifices, and the bundle of filaments collected has a denier of 163. The filament bundle is drawn 3.5× through boiling water in a one-step drawing process. A portion of the bundle is cut to 3¼ inch staple fibers and dried at 140° C. for 20 minutes. The resulting fibers have a pleasing delustered appearance, equivalent to the appearance of conventional "semi-dull" acrylic fibers.

Dyeing of the delustered fiber.—The staple fibers are scoured by boiling them for 30 minutes in a solution of 1%, based on fiber weight, of a detergent (identified as Merpol HCS, product of E. I. du Pont de Nemours & Co., Inc.). The fibers are then rinsed and dyed by adding 2.0 gms. of fibers to 300 ml. of a master dye solution at a pH of 4.5–5.0 made up by mixing 20 ml. of a 2% solution of a blue basic dye (identified as Sevron Blue NF, product of E. I. du Pont de Nemours & Co., Inc.), 3000 ml. of deionized water, 1.0 ml. of a 10% solution of the same detergent employed in the scouring step, 2.0 ml. of a 10% solution of a cationic surface active agent (identified as Retarder LAN®, product of E. I. du Pont de Nemours & Co., Inc.), and 2.0 gms. of sodium sulfate. The fibers are added to the dye bath at 68–75° C. and brought to the boil over a 20-minute period. The dye bath is maintained at the boil for two hours, after which time the dye is completely exhausted. The fibers are then scoured again for 15 minutes at 70° C. and dried in an automatic dryer for 60 minutes. A two-gram fiber pad is then carded and the K/S value is measured. The K/S value is found to be 3.57.

Preparation and flame testing of knitted fabric.—A portion of the uncut 3.5× drawn filament bundle of approximately 150 denier is knitted into a double knit fabric having a weight of 8.88 oz./sq. yd. (employing a "Kamoj Stoll" 14 cut machine), using a Swiss double pique stitch with a stitch setting of 11.5. A finish is applied to the filament bundle prior to knitting and removed by scouring for 15 min. at 70° C. after knitting. The fabric is dried at 140° C. for 20 min. To simulate a dyeing step, the fabric is placed in a solution prepared (per gram of fabric weight) from 1500 ml. of deionized water, 5.0 ml. of a 10% solution of a cationic surface active agent, 1.0 g. of sodium sulfate, and 0.5 ml. of a 10% solution of a detergent. The fabric is boiled for 2 hours, rescoured at 70° C. for 15 min., and dried in an automatic dryer for 60 min. A sample of the fabric is subjected to the modified 45° Angle Test for flammability. The specimen is rated "Would Not Ignite." Another sample of the fabric is subjected to the Vertical Test for Flammability. It ignites, but the flame goes out and the specimen is rated "Self-Extinguishing." Staple pads of this fiber have an LOI value of 0.286.

Particle size analysis and other fiber properties.—It is determined by electron microscopy evaluation that metal oxide particles larger than 500 A. occupy 0.85% of the area of the fiber cross section. The calculated antimony oxide content of the fiber is 5.0%. The calculated titanium dioxide content of the fiber is 7.72%, of which 7.32% is from the sol and 0.4% is from the large particle size $TiO_2$ slurry in dimethylformamide.

Comparative samples.—The preparation of the delustered fiber as described above is repeated, except that none of the colloidal antimony oxide/titanium dioxide sol is added. Thus, although the polymer of the fiber contains 17.51% chlorine and 0.4% $TiO_2$, there is no antimony present in the fiber. The resulting fiber is delustered, having a "semi-dull" appearance. A pad of the staple fibers is dyed according to the procedure described above. The K/S value of the dyed, delustered fiber is 3.07. Staple pads of the fiber, made as described above, have an LOI value of only 0.220 and are totally consumed by flame in both the Modified 45° Angle Test and the Vertical Test. It is determined by electron microscopy evaluation that metal oxide particles larger than 500 A. occupy 0.96% of the area of the fiber cross section.

The preparation of the delustered fiber as described above is repeated, except as follows: None of the colloidal antimony oxide/titanium dioxide sol is added and none of the titanium dioxide slurry is added; however, a dispersion of antimony oxide is added. This dispersion is prepared by sand grinding 100 gms. of a commercial grade antimony oxide having a particle size of 0.1–0.8 micron, 100 ml. of dimethylformamide, 2 gms. of the terpolymer, and 100 gms. of 20–30 mesh clean sand in a 1000 ml. stainless steel beaker for one hour, using a 3″ disc stirrer operating at 2400 r.p.m. The resulting paste is filtered through a 200-mesh stainless steel screen. In this preparation, 611.6 gms. of the terpolymer is blended into a chilled mixture of 1318.5 gms. of dimethylformamide containing 13.0 gms. of the alkyltin mercaptide stabilizer and 64.0 gms. of antimony oxide slurry. The resulting fiber has a chalky, dull appearance. A pad of the staple fibers is dyed according to the procedure described above. The K/S value of the dyed, delustered fiber containing the antimony oxide of large particle size is only 2.63. Knitted fabrics of the fiber are subjected to flammability tests. The LOI value is 0.246. In the Modified 45° Angle Test the fabric is rated "Would Not Ignite." However, in the Vertical Test, the fabric burns and is totally consumed. It is determined by electron microscopy evaluation that metal oxide particles larger than 500 A. occupy 6.79% of the area of the fiber cross section. The fiber contains 5.5 wt. percent antimony oxide.

EXAMPLE II

Delustered, flame-retardant, acrylonitrile/vinyl bromide/sodium styrenesulfonate terpolymer having good dyeability Preparation of antimony ethylene glycol ester.—Antimony glycoxide (antimony ethylene glycol ester) is made from antimony trioxide, ethylene glycol, and hydrogen peroxide by the following procedure: 145.7 grams of antimony trioxide (0.5 mol) and 600 gms. of ethylene glycol are added to a 1 liter round bottom flask equipped with a mechanical stirrer and thermometer. This is attached to a vacuum distillation apparatus. The reactants are then heated to about 200° C. and stirred at atmospheric pressure. As the antimony trioxide and ethylene glycol react, water is liberated which is removed by distillation. A total of 163.1 gms. of distillate are removed containing 27 gms. of water (1.5 mols), the remainder being ethylene glycol. The product of this reaction is a solution of antimony ethylene glycol ester in trivalent state.

The solution is then cooled to about 170° C. and a dropping funnel containing 56.6 gms. of 31.2% hydrogen peroxide aqueous solution (~½ mol) is attached to the reactor. Two hundred grams of ethylene glycol are added at this point. The system is evacuated to a pressure of 265±10 torr and hydrogen peroxide is added dropwise over a one hour period. During this addition the solution is heated and water is removed by vacuum distillation together with 4 parts of ethylene glycol per part of water. The temperature of the solution is 160–170° C. at 265± 10 torr. The resulting solution contains pentavalent antimony ethylene glycol ester dissolved in the excess glycol. Excess ethylene glycol is removed by distillation until a residue of about 450 gms. remains. The temperature of the solution raises to about 210° C. The resulting solution is then filtered through celite to remove a trace amount (about one g.) of undissolved antimony oxide.

The resulting product is a solution of antimony ethylene glycol esters in ethylene glycol. The solution contains 26.9% antimony as determined by atomic absorption and 50% of the antimony is in the pentavalent state, as determined by dissolving in HCl, adding potassium iodide, and titrating the liberated iodine, with sodium triosulfate. (Details of the analytical procedure are given in Scotts Standard Methods of Chemical Analyses, published by D. Van Nostrand & Co., Inc., Princeton, N.J., pp. 75–76, 1939).

After filtration 335 gms. of the solution are added to a 500 cc. round bottom flask equipped for vacuum distillation. The excess glycol is the removed by distillation at about 9 torr pressure. The distillation is continued until the temperature of the residue reaches 150° C. A residue of 243.9 gms. is obtained. Two hundred twenty gms. of this are diluted with 90 gms. of dimethylformamide. The resulting solution of antimony III and V ethylene glycol esters in dimethylformamide is fluid and light in color. When analyzed as described, it is found to contain 25.6% antimony, 41.5% of which is in the pentavalent state.

Preparation of polymer.—An acrylonitrile/vinyl bromide/sodium styrenesulfonate terpolymer is prepared in a 7-liter aluminum reactor equipped with an overflow to maintain constant volume, agitator, thermometer, and an external water jacket to regulate the reaction temperature.

The temperature in the reactor is maintained at 14° C. To the reactor are fed continuously the following solutions:

(a) A mixture of 3000 ml. of acrylonitrile and 750 ml. of vinyl bromide at the rate of 25 ml./80 sec.;

(b) A solution of 35 gms. of sodium styrenesulfonate in 6100 ml. of methanol and 1000 ml. of deionized water at the rate of 10 ml./30 sec.;

(c) A solution of 271 gms. of sodium bisulfite and 0.1 g. of ferrous ammonium sulfate in 6700 ml. of deionized water and 1000 ml. of methanol at the rate of 10 ml./60 sec.; and (d) A solution of 34 gms. of potassium persulfate in 7700 ml. of deionized water at the rate of 10 ml./60 sec.

Sulfur dioxide is metered into the reaction mixture at a rate sufficient to maintain the effluent from the reactor at a pH in the range of 2.5–3.5. The hold-up time in a reactor under these conditions is 120 minutes. The effluent is collected and the reaction in the effluent is stopped after six hours by addition of a 1% solution of the tetrasodium salt of ethylenediamine tetraacetic acid. The effluent is then filtered and the collected polymer is washed twice with water, twice with acetone, and dried at 50° C. overnight in a vacuum oven. The conversion of monomer to polymer is 35%. Analysis of random samples of the polymer give average results of 1.64 for intrinsic viscosity, 84.1 meq./kg. for acidity, and 12.27% for bromine content.

Preparation of delustered fiber.—A quantity of 124 gms. of the terpolymer is blended into a mixture of 243 gms. of dimethylformamide, 4.8 gms. of a 40% slurry of antimony trioxide having a particle size of 0.1–0.8 micron in dimethylformamide, 131.0 gms. of antimony glycoxide solution prepared as described in the first section of the example, and 3 gms. of an alkyl tin mercaptide stabilizer (Thermolite® 31, product of M & T Chemicals, Inc.). The solution is heated to 115° C. and dry spun by forcing the solution through a spinneret into an aspiration chamber preheated to 180° C. The spinneret employed has 18 orifices, and the bundle of filaments collected has a denier of 150. The filament bundle is drawn 4.5× through boiling water in a one-step drawing process, crimped to a level of 10–12 crimps/inch, cut into 2½ inch staple, and dried at 140° C. for 20 minutes. The resulting fibers have a pleasing delustered appearance, equivalent to the appearance of conventional, commercially available "semi-dull" acrylic fibers.

Dyeing of the delustered fiber.—The staple fibers, when dyed by the procedure described in Example I, exhibit a K/S value of 2.72.

Particle size analysis and other fiber characteristics.— It is determined by electron microsity evaluation that metal oxide particles larger than 500 A. occupy 1.42% of the area of the fiber cross section. The calculated antimony oxide content of the fiber is 8%, of which 1.6% comprises the commercial grade antimony oxide having a particle size of 0.1–0.8 micron and the remaining 6.4% comprises antimony oxide of very fine particle size derived from the antimony oxide by hydrolysis. When tested for flammability, staple pads made of the fibers are found to have an LOI value of 0.298.

Comparative sample.—The preparation of the delustered fiber as described above is repeated, except that none of the antimony glycoxide is added, and 24.0 gms. of the 40% slurry of antimony oxide is blended into the polymer solution to prepare the fiber. The resulting fiber, which contains 8% antimony oxide, has a chalky, dull appearance, similar to the comparative sample of Example I containing 5% antimony oxide and having metal oxide particles larger than 500 A. occupying 6.79% of its fiber cross sectional area. When tested for flammability, staple pads from these highly delustered fibers are found to have an LOI value of 0.276. The K/S value of these fibers, when dyed, is only 2.08, or 0.64 unit lower than the K/S value of the dyed fiber of the invention.

EXAMPLE III

Delustered, flame-retardant, acrylonitrile/vinyl chloride/ sodium styrenesulfonate terpolymer having good dyeability An acrylonitrile/vinyl chloride/sodium styrenesulfonate terpolymer is obtained by a suspension polymerization with an azo-type initiation catalyst. It has an inherent viscosity of 1.36, a chlorine content of 13.61% (corresponding to a vinyl chloride content of 24.5%), and a total acidity of 26.5 meq./kg.

A quantity of 5450 parts of the terpolymer is dissolved in 10,440 parts of dimethylformamide at 55±5° C. To the polymer solution is added 191 parts of $TiO_2$ slurry (corresponding to 0.4% $TiO_2$ based on the polymer) 2.7 parts of citric acid, 163 parts of an alkyl tin marcaptide stabilizer, and 253 parts of antimony glycoxide prepared as described in Example II. The solution is dry spun to form filaments, which are then drawn 4.5× in boiling water in a one-step drawing process. The drawn filaments are crimped to a level of 10–12 crimps/inch, cut into 2-inch staple fibers, and dried at 130° C. for 30 minutes.

The resulting fibers have a pleasing delustered appearance, equivalent to the appearance of conventional, commercially available, "semi-dull" acrylic fibers. It is determined by electron microscopy evaluation that metal oxide particles larger than 500 A. occupy 2.06% of the area of the fiber cross section. The antimony oxide content of the fiber is 2.15%, and the titanium dioxide content is 0.4%. When tested for flammability, staple pads from fibers of the example have an LOI value of 0.246.

The staple fibers, when dyed, are found to exhibit good dyeability. The K/S value of the dyed fiber is 2.38.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A fiber of an acrylonitrile copolymer containing at least 10% by weight atoms of chlorine or bromine, said atoms being directly connected to carbon atoms of the copolymer; said copolymer having distributed throughout finely divided particles of an oxide of antimony in an amount of at least 2% by weight based on the weight of copolymer, said particles being less than 500 A. in size; said copolymer also having distributed throughout, particles of a metallic oxide greater than 500 A. in size in an amount sufficient to deluster the fiber, but not more than 2.25% of the area of an electron micrograph of a cross section of the fiber.

2. The fiber of claim 1 wherein the amount of oxide polymer.

3. The fiber of claim 2 wherein the acrylonitrile copolymer contains at least about 60% by weight units derived from acrylonitrile.

4. The fiber of claim 3 wherein the particles of the metallic oxide are titanium dioxide.

5. The fibers of claim 3 wherein the particles of the metallic oxide are antimony oxide.

References Cited

UNITED STATES PATENTS

| | | | |
|---|---|---|---|
| 2,819,173 | 1/1958 | Dithmar | 106—166 |
| 3,480,582 | 11/1969 | Brooks | 260—45.75 |
| 3,193,602 | 7/1965 | Leonard | 264—182 |
| 3,449,072 | 6/1969 | Freeman | 23—142 |
| 3,455,862 | 7/1969 | Opferkuch | 260—32.6 |
| 3,560,441 | 2/1971 | Schwartz | 260—45.75 |

ALLAN LIEBERMAN, Primary Examiner

R. ZAITLEN, Assistant Examiner

U.S. Cl. X.R.

260—37 N

UNITED STATES PATENT OFFICE
CERTIFICATE OF CORRECTION

Patent No. 3,748,302  Dated July 24, 1973

Inventor(s) Edward Barry Jones

It is certified that error appears in the above-identified patent and that said Letters Patent are hereby corrected as shown below:

Col. 12, claim 2, line 2: Delete "polymer" and add --antimony present is at least 2.5% by weight of copolymer--.

Signed and sealed this 1st day of January 1974.

(SEAL)
Attest:

EDWARD M. FLETCHER, JR.
Attesting Officer

RENE D. TEGTMEYER
Acting Commissioner of Patents